Patented July 2, 1940

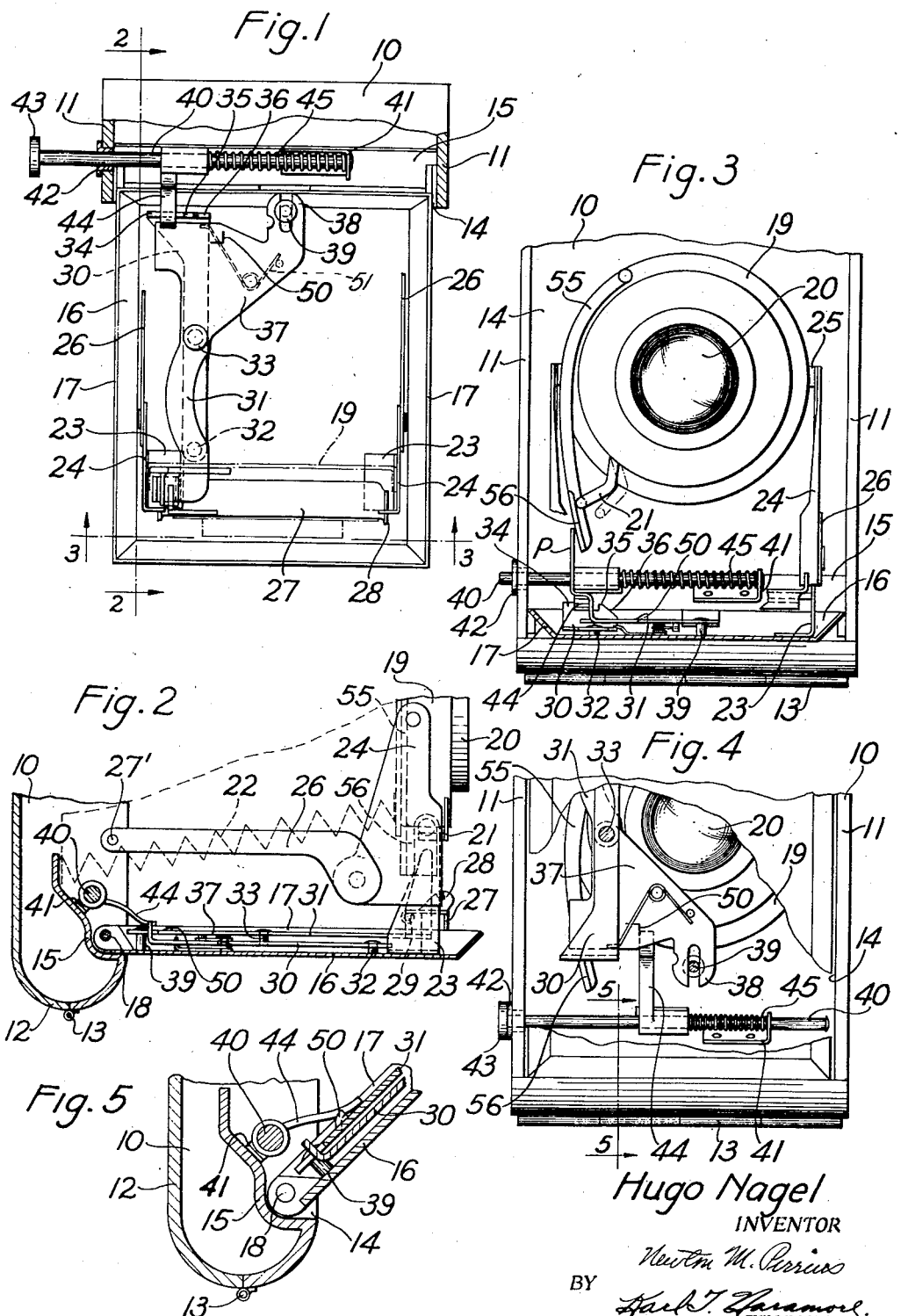

2,206,111

UNITED STATES PATENT OFFICE 2,206,111

SHUTTER ACTUATING MEANS ON THE BODY OF A FOLDING CAMERA

Hugo Nagel, Harrow, England, assignor to Eastman Kodak Company, Rochester, N. Y., a corporation of New Jersey Application July 29, 1938, Serial No. 222,025
In Great Britain December 17, 1937

9 Claims. (Cl. 95—40)

The present invention relates to a foldable camera of the type in which the shutter is capable of being actuated by a release member which is operated externally of the camera body, and particularly to an arrangement where the release member on the camera body is automatically disconnected from the actuating mechanism carried by the camera bed when the camera is folded to a closed position to permit of the actuating mechanism on the bed remaining in its inoperative position when the release member is moved to and held in its retracted position.

One such shutter release mechanism is described in U. S. Patent 2,123,908, A. Nagel, July 19, 1938, in which the externally operable member, comprising a headed rod or plunger mounted for sliding movement in the camera body, is adapted to be manually retracted when the camera is closed; and automatically ejected when the camera is reopened. In this noted construction, a release linkage carried by the camera bed co-acts at one end with the shutter trigger, and is coupled at the other end with the headed rod so that when axial pressure is applied to the latter, the release linkage slides at right angles to the optical axis of the camera to effect a release of the shutter trigger. When the camera is closed and the plunger is retracted, the release linkage is also moved across the camera bed and is only returned to its normal inoperative position when the camera is reopened.

It will be readily understood that an inexperienced operator, when opening the camera, may hold the camera in such a way as to prevent the ejection of the release plunger in which case the sliding linkage might be prevented from returning to its normal inoperative position. If this should happen, and the release plunger is not ejected until after the camera is in its fully extended position, the linkage would be positioned on the wrong side of the shutter trigger. The operator might then actuate the body release member for the purpose of making an exposure, without observing that the release mechanism was inaccurately positioned. He would then quite probably wind on the film under the impression that the picture had been taken, thereby wasting an exposure area.

Although in actual practice it is extremely unlikely that the parts would be incorrectly positioned as described above, the primary object of the present invention is to provide a shutter actuating mechanism of the type described wherewith such an event is impossible. Another object of the invention is to provide a shutter actuating mechanism of the type described which is so arranged that the release member on the camera body is automatically disconnected from that portion of the mechanism carried by the camera bed when the camera bed is moved to its closed positon so that the release member on the body can be moved to a retracted position independently of the mechanism on the bed which remains or is normally held in its inoperative position. And yet another object is to provide a shuttter actuating mechanism of the type described which includes a catch means carried by the camera bed for engaging and holding the release member in a retracted position when the folding bed is moved from its open position, and which automatically releases the release member for normal extension when the bed is moved to its full open position. And a further object is to provide an arrangement whereby the release member is automatically operatively connected to the mechanism carried by the camera bed when said release member returns to its extended position. And another object is to provide an arrangement whereby the release member on the camera body is automatically released from the mechanism carried by the camera bed when said bed is only partly closed.

The above and other objects of the invention are realized in a photographic camera including a camera body, a folding bed, and a shutter assembly including an operating arm in combination with a shutter actuating means comprising a linkage movably mounted upon the folding bed for actuation of the shutter operating arm and including a release member movably mounted upon the camera body for movement to a retracted position, all arranged so that the release member on the camera body is automatically disconnected from the linkage on the camera bed when the bed is moved to its closed position whereby said linkage is permitted to remain in its inoperative position while the release member is moved to and held in its retracted position by a catch means carried by the camera bed.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which, Fig. 1 is a plan view of a photographic camera with its folding bed in open position, Fig. 2 is a partial side elevation of a folding camera equipped with the shutter actuating mechanism of the present invention, Fig. 3 is a front elevation of a folding camera with the bed open, certain parts being omitted to more clearly show the shutter actuating mechanism in its inoperative position, Fig. 4 is a front elevation of the camera in closed position, the bed being broken away to show the relationship of the parts of the shutter actuating mechanism when the camera is folded to this position, Fig. 5 is a fragmentary section taken on line 5—5 of Fig. 4, and showing how the release member on the camera body and the linkage on the camera bed are disconnected as the camera bed is moved from its full open position.

Like reference characters refer to corresponding parts throughout the drawing.

The present invention which is an improvement of that shown in U. S. Patent 2,123,903, A. Nagel, July 19, 1938, is illustrated in connection with a folding camera of the hinged bed type, but it is to be understood that the invention may also be applied to other types of folding cameras with collapsible or folding fronts. The camera illustrated consists essentially in a camera body, a folding bed, and a shutter assembly.

The camera body may comprise a camera housing 10 having side walls 11 and a camera back 12 connected to the camera housing by a hinge 13. The front of the housing 10 is provided with the usual opening 14 through which the bellows, the shutter assembly, and the erecting mechanism therefor pass into the housing when the camera is folded, and that portion of the housing at the bottom of this opening may be formed back into the housing to form a support 15, as shown in Figs. 2 and 5, the purpose of which will be clearly pointed out hereinafter.

The folding bed comprises a bed plate 16 having side flanges 17 and pivotally connected by pins 18 to the side walls 11 of the camera housing 10. Said bed plate 16 is adapted in a well known manner to be moved to an open position illustrated in Figs. 1, 2, and to a closed position indicated in Fig. 4. Fig. 5 shows the bed plate in an intermediate position between its open and closed positions. Referring to Figs. 2 and 5, it will be noticed that the support 15 is curved to receive the rear end of the bed plate 16 and permit it to pivot about the pivot pins 18.

The shutter assembly comprises a photographic shutter 19 of conventional design and includes an objective 20 and a shutter operating arm 21 which may be moved to the position indicated in dotted lines in Fig. 3 for actuation of the shutter. A foldable bellows 22 is connected between the shutter 19 and the inside of the housing 10.

The shutter assembly is mounted upon the folding bed in a known manner and may be folded into the camera body and covered by the folding bed. Such an arrangement may include uprights 23 on the bed plate 16, side plates 24 pivoted at their lower ends to uprights 23 and at their upper ends to ears 25 attached to the shutter 19, and side braces 26 pivoted at their forward ends to side plates 24 and at their rear ends in the camera body by pivots 27'. A latching arrangement for holding the bed and shutter assembly in open position may comprise a bar 27 carrying jaws 28 and pivotally mounted upon a rod 29 extending between uprights 23. A spring, not shown, normally urges the bar 27 upwardly and jaws 28 into engagement with lugs on the side plates 24.

In order to collapse the folding bed it is merely necessary to depress the bar 27 and to fold the bed about the hinged connection toward the camera body whereupon the shutter assembly is moved into the camera body and the folding bed encloses the same. The camera features thus far described may vary considerably without affecting the applicability of the invention which will now be described.

A shutter actuating means is provided for actuating the shutter operating arm and is operable from the camera body. Such a shutter actuating means includes a release member movably mounted in the camera body, and an interconnecting release linkage movably mounted on the camera bed.

A release linkage extending longitudinally of the camera bed and forming a part of the shutter actuating means comprises two levers 30 and 31. Lever 30, hereinafter referred to as the connecting member, is pivoted to the bed 16 at its front end as indicated at 32, and lever 31, hereinafter referred to as the actuating member, is arranged above the connecting member 30 and is pivoted thereto at a point 33 between its ends. The free end of the connecting member terminates a short distance from the hinge axis of the camera bed, and is formed with a pair of spaced upstanding lugs 34 and 35. Lug 35 projects upwardly only a short distance, see Fig. 3, and is formed with an inclined surface 36 for the purpose hereinafter described. The forward end of the actuating member 31 is formed with an upstanding projection P which is adapted to co-act with the shutter operating arm 21 when moved by the connecting member, as will be hereinafter described, to trip the shutter. The rear end of the actuating member 31 terminates a short distance in front of the rear end of the connecting member 30 and constitutes a substantially triangular plate member 37. A rearwardly projecting forked lug 38 is formed at the inner corner of the plate 37, and the limbs of said lug embrace a stud 39 fixed to the rear end of the bed substantially midway between the sides thereof.

The shutter actuating means also includes a release member which is movably mounted upon the camera body, and which comprises a stem 40 slidably supported at one end by a bracket 41 on the support 15, and at the other end by a bushing 42 in the side wall 11 of the camera body. A finger-piece 43 is fixed to the outer end of the stem 40. The connection between the release member and the release linkage, to permit the latter to move transversely of the camera bed 16 upon axial pressure being applied to the release member, consists of a finger 44 rotatably carried by the stem 40 and engaging between the upstanding lugs 34 and 35 on the connecting member. A helical spring 45 surrounding the stem 40 between the bracket 41 and the finger 44 serves to normally urge the stem 40 to its extended or inoperative position after the shutter has been released. This spring in addition to serving in the capacity described is so connected to the bracket 41 and the finger 44 that it normally tends to rotate the finger in a clockwise direction relative to the stem 40 or toward the camera bed 16. Instead of having the finger 44 mounted on the stem so as to be capable of rotation but incapable of axial movement relative thereto, it is to be understood that the finger could be fixed to the stem, and the stem itself could be rotatably mounted relative to the bracket 41 and the bushing 42 in which case the spring 45 would be connected to the bracket and the stem so as to rotate the stem as a whole in the proper direction to normally urge the finger 44 fixed thereto toward the camera bed.

When the camera is in its full open position and it is desired to make an exposure, axial pressure is applied to the finger piece 43 on the stem 40. Upon this movement, the finger 44 on the stem 40 causes the connecting member 30 to move across the bed 16 about its pivot 32. At the same time, the actuating member 31 rocks about the stud 39 at the rear end of the camera bed so that the forward end thereof moves across the bed and actuates the shutter operating arm 21 through its upstanding projection P.

When the camera bed is in its full open position, the plate member 37 and the finger 44 on the stem 40 are in substantially the same plane. As soon as the operator commences to move the camera bed toward its closed position, the angular relation between the finger 44 and the plate member 37 is varied due to the finger riding up the surface of the plate member, see Fig. 5. Thus when the camera has been closed, or moved a short distance from its full open position, the finger 44 will have rotated about the stem 40 so that when the latter is pressed inwardly the finger will slide over the short lug 35 on the connecting member. It will thus be seen that when the stem 40 is actuated with the camera closed, the release linkage remains in its normal inoperative position, as there is no connection between the finger 44 and the connecting member 30.

In order to retain the stem 40 in its retracted position after it has been pressed inwardly, a small lug 50 extends from the plate member 37 and is so positioned thereon that when the stem is retracted after closing the camera, the finger 44 on the stem slides over an inclined surface of the lug and drops behind the latter to be held in a retracted position until the camera is reopened. As the camera is being reopened, the lug 50 on the plate member 37 gradually moves away from the finger 44 until the bed is in its full open position, in which position the finger slides clear of the lug 50 and is returned to its normal position when the stem is returned to its extended position by the spring 45. When the stem is returned to its extended position by the spring 45, the finger 44 rides up the inclined surface 36 of the short lug 35 and drops down between the two lugs 34 and 35 to again operatively connect the stem and the release linkage.

As it may happen that an operator will depress the stem 40 during closing of the camera and before the finger 44 has been disconnected from the release linkage, a small hair spring 51 is provided between the connecting member 30 and the actuating member 31 so that these parts will be automatically returned to their normal inoperative positions when the camera bed is closed and when the finger 44 is engaged by the lug 50 to hold the stem in a retracted position.

It has been found that a smooth shutter release action is obtained if an arcuate arm 55 is pivoted to the camera front and formed at its lower end with a flange 56 adapted to coact with the shutter operating arm 21. In this case the upstanding projection P at the forward end of the actuating member 31 may be made shorter to cooperate with the flange 56 and the actuating arm 55 instead of with the shutter operating arm 21. One advantage of the shorter projection P is that the folding movement of the camera is simplified and there is no possibility of its projecting into the bellows and damaging the same when the camera is completely closed.

Although I have shown and described a certain specific embodiment of my invention, I am fully aware that many modifications thereof are possible. My invention, therefore, is not to be restricted except insofar as is necessitated by the prior art and by the spirit of the appended claims.

Having thus described my invention, what I declare is new and desire to secure by Letters Patent of the United States is:

1. In a photographic camera, the combination with a camera body part, a foldable bed part connected to said camera body and movable to open and closed positions, and a shutter assembly adjacent said bed part and including an operating arm, of a shutter actuating means between said camera body and said operating arm, and comprising a member movable with respect to said bed part to actuate said operating arm and normally held in its inoperative position, a second member movably mounted on said camera body part, and connecting means between said members whereby the same are adapted to be operatively connected when the camera bed part is in its open position, and are adapted to be disconnected when said bed part is moved from its open position, said connecting means including a lever movably mounted on said bed and connected to said first member, and a finger mounted on said second member to move therewith and adapted to overhang and operatively connect said lever to said second member when the bed part is in its open position, and adapted to be engaged and moved from operative connection with said lever by the bed part when the same is moved from its open position.

2. In a photographic camera, the combination with a camera body part, a bed part hinged to said camera body and movable to closed and open positions, and a shutter assembly adjacent said bed part and including an operating arm, of a shutter actuating means between said camera body and said operating arm, and comprising a member movable on said bed part for actuating said operating arm and normally held in its inoperative position, a second member movably mounted on said camera body and movable to a retracted position, and connecting means between said members whereby the same are adapted to be connected when the camera bed is in its open position and adapted to be disconnected when said bed is moved from its open position, said connecting means including a lever movably mounted on said camera bed with one end adjacent the hinge point of said bed on the camera body and connected to said first member, and a finger movable with said second member and overhanging said hinge to operatively engage the end of said lever lying adjacent said hinge when the bed is in its open position, said finger capable of movement in the direction of movement of said bed and adapted to be engaged and moved by said bed when the same is moved from its open position, whereby it is disconnected from said lever.

3. In a photographic camera, the combination with a camera body, a foldable bed connected to said camera body and movable to closed and open positions, and a shutter assembly adjacent said bed and including an operating arm normally held in its inoperative position, of a shutter actuating means between said camera body and said operating arm, including a member movable with respect to said bed to actuate said operating arm, said member normally held in an inoperative position wherein it lies adjacent said operating arm when the camera bed is opened, and including a second member movably mounted on said camera body, and movable to a retracted position, connecting means between said two members arranged so that said members are operatively connected when said bed is in its open position, and are disconnected when the bed is moved from its open position, whereby the second member may be moved to its retracted position leaving the first member in its inoperative position, and a catch means carried by said bed, and located to engage and hold said second member in its retracted position only when said bed is moved from its open position.

4. In a photographic camera, the combination with a camera body part, a foldable bed part connected to said body part to move between closed and open positions, and a shutter assembly connected to said bed and including an operating arm, of a shutter actuating mechanism between said camera body part and said operating arm comprising an actuating member movably mounted on said bed part for engaging said operating arm to actuate the same when the bed part is open, but normally held in its inoperative position, a connecting member movably mounted on said bed part and connected to said actuating member to move the same, a release member mounted in the camera body part to move between an extended and a retracted position, and arranged relative to said connecting member whereby the two are operatively connected when the camera bed part is in its open position, whereby movement of the release member actuates the shutter, and are disconnected when the bed part is moved from its open position, and a catch means on said actuating member adapted to engage said release member and hold it in its retracted position only when said bed part is moved from its open position.

5. In a photographic camera, the combination with a camera body part, a foldable bed part connected to said body part to move between closed and open positions, and a shutter assembly connected to said bed and including an operating arm, of a shutter actuating mechanism between said camera body part and said operating arm comprising an actuating member movably mounted on said bed part for engaging said operating arm to actuate the same when the bed part is open, a connecting member movably mounted on said bed part and connected to said actuating member to move the same, a spring normally acting on said connecting member to hold the same and the actuating member connected thereto in their inoperative positions; a release member mounted in the camera body part to move between extended and a retracted position, and arranged relative to said connecting member whereby the two are adapted to be operatively connected when the camera bed part is in its open position, whereby movement of the release member actuates the shutter, and are adapted to be disconnected when the bed part is moved from its open position, and a catch means carried by one of said members on the bed part located to engage and hold said release member in its retracted position only when the bed part is moved from its open position.

6. In a photographic camera, the combination with a camera body, a bed connected thereto for movement to closed and open positions, and a shutter assembly operatively connected to said bed and including an operating arm, of a shutter actuating means between said camera body and said operating arm, comprising a lever movably connected to said bed and having one end adjacent the point of connection between said bed and the camera body, an actuating member movably carried by said bed and adapted to be moved to an operative position for engaging and actuating said operating arm upon movement of said lever, means for normally holding said actuating member and along with it said lever in their inoperative positions, and a release member slidably mounted in said camera body to move between an extended and a retracted position, said release member located adjacent the point of connection between said bed and said camera body and including a portion adapted to operatively engage the end of said lever adjacent the point of connection of said bed and camera body when the bed is in its open position, whereby the shutter operating arm is actuated by movement of said release member to its retracted position, but adapted to be engaged and moved by said bed in moving from its open position whereby it is disconnected from the end of said lever so that the release member can be moved to its retracted position leaving said actuating member and said lever in their inoperative positions.

7. In a photographic camera, the combination with a camera body, a bed connected thereto for movement to closed and open positions, and a shutter assembly operatively connected to said bed and including an operating arm, of a shutter actuating means between said camera body and said operating arm, comprising a connecting member movably connected to said bed and having a turned-up slotted end adjacent the point of connection between said bed and the camera body, an actuating member movably carried by said bed and arranged to be moved to an operative position for engaging and actuating said operating arm upon movement of said lever, means for normally holding said actuating member and along with it said connecting member in their inoperative position, and a release member slidably mounted in said camera body to move between an inoperative and a retracted position, said release member located adjacent the point of connection between said bed and said camera body, and including a portion overhanging the point of connection between said bed and body parts adapted to operatively engage the slot in the end of said connecting member adjacent the point of connection of said bed and camera body when the bed is in its open position, whereby the shutter operating arm is actuated by movement of said release member to its retracted position, and is adapted to be engaged and moved by said connecting member when said bed is moved from its open position to be removed from said slot in the end of said connecting member so that the release member and said connecting member can be moved to their retracted positions leaving said actuating member in its inoperative position, and a catch means carried by said actuating member for engaging and holding said release member in its retracted position when the bed is closed.

8. In a photographic camera, the combination with a camera body, a bed hinged to said camera body to move between open and closed positions, and a shutter assembly operatively connected to said bed and including a shutter operating arm, of a shutter actuating mechanism between said camera body and said operating arm, comprising a lever pivoted at one end to the bed, the free end of said lever being adjacent the point of hinging between the bed and camera body and being upturned and provided with a slot, an actuating member connected to said lever to be moved thereby for engaging and actuating said shutter operating arm, means for normally holding said actuating member and said lever in their inoperative positions, a release member slidably mounted in said camera body to move between an extended and a retracted position, means normally moving said release member to its extended position, a finger fixed to said release member, and arranged to extend across the point of hinging between said bed and camera body and into the slot in said lever when the bed is in its open position to operatively connect the release member and said lever, said finger capable of movement in the direction of movement of said bed and normally spring pressed into engagement therewith whereby it is adapted to be automatically removed from said slot to disconnect the two when the bed is moved from its open position whereby the release member can be retracted independently of said lever, and a catch means on said actuating member adapted to engage and hold said release member in its retracted position when the bed is moved from its open position.

9. In a photographic camera, the combination with a camera body, a bed hinged to said camera body to move between open and closed positions, and a shutter assembly operatively connected to said bed and including a shutter operating arm, of a shutter actuating mechanism between said camera body and said operating arm comprising a lever pivoted at one end to the bed, the free end of said lever lying adjacent the point of hinging between the bed and camera body, a pair of spaced lugs on the free end of said lever, one of which is shorter than the other and has an inclined edge, an actuating member connected to said lever to be moved thereby for engaging and actuating said shutter operating arm, means for normally holding said actuating member and said lever in their inoperative positions, a release member slidably mounted in said camera body to move between an extended and a retracted position, means normally moving said release member to its extended position, a finger movable with to said release member, and arranged to extend across the point of hinging between said bed and camera body and into the space between said lugs on said lever when the bed is in its open position to operatively connect the release member and said lever, means normally forcing said finger into engagement with said actuating member whereby the same is adapted to be automatically raised above the shorter of said lugs to disconnect the two when the bed is moved from its open position, whereby the release member can be moved to its retracted position independently of said lever, and a catch means on said actuating member located to engage and hold said finger to hold said release member in its retracted position when said bed is moved to its closed position, and adapted to automatically release the same when the bed is moved to its open position, whereupon the release member returns to its extended position and the finger movable therewith is cammed over the inclined edge of said shorter lug to enter the space between said lugs.

HUGO NAGEL.